UNITED STATES PATENT OFFICE.

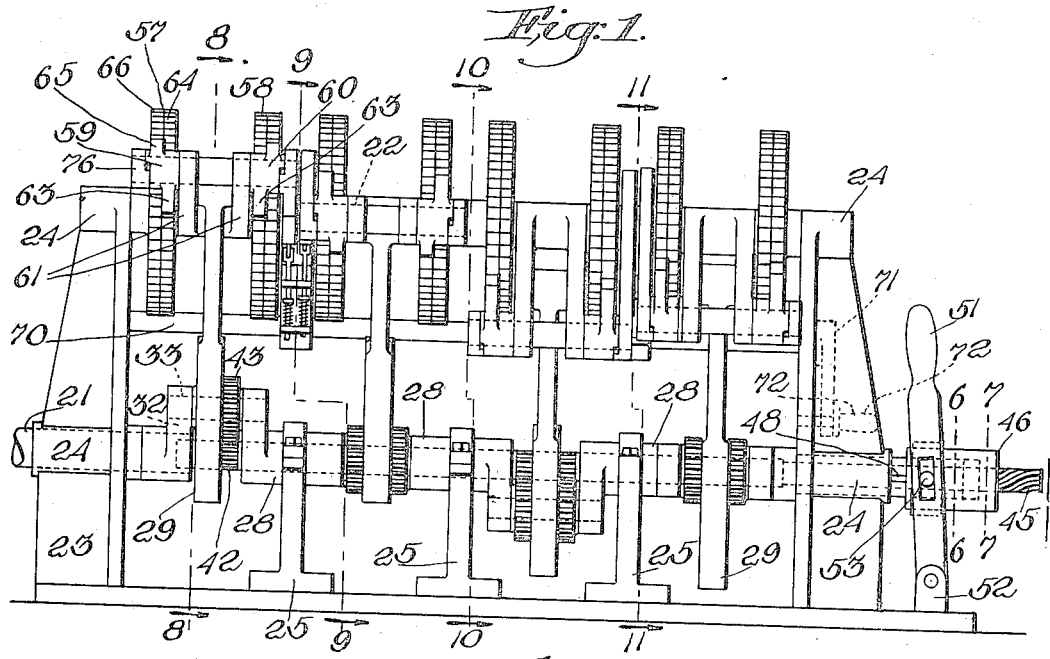
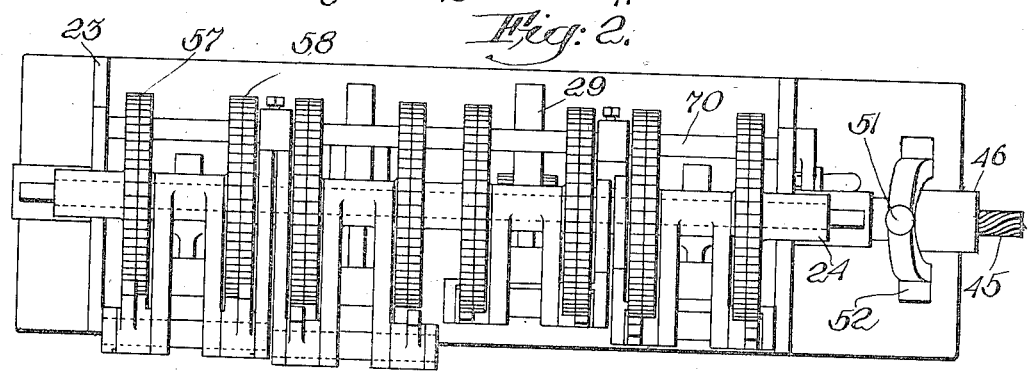
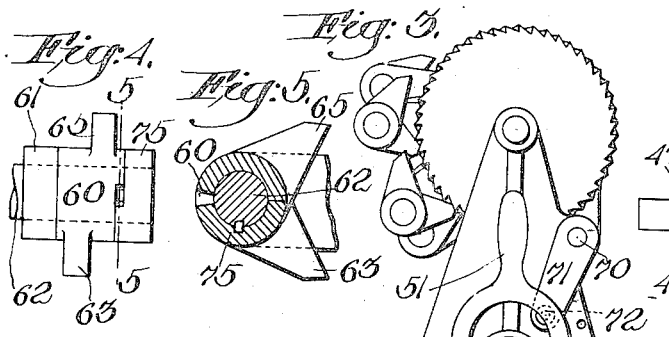
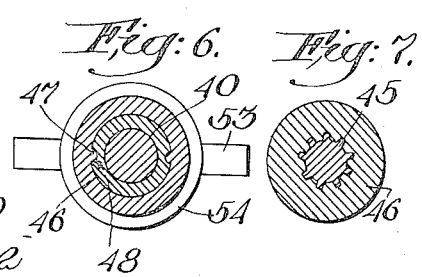

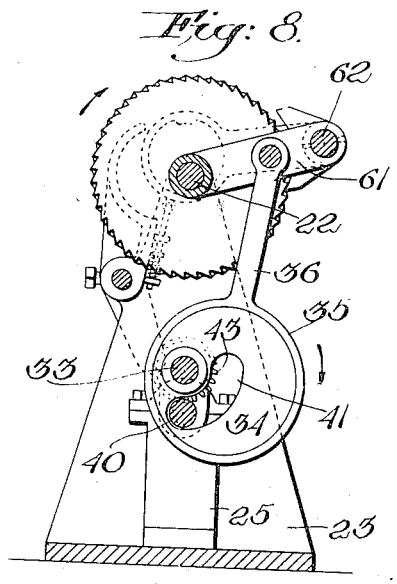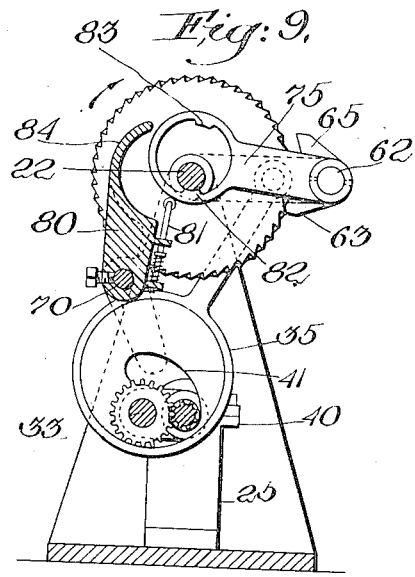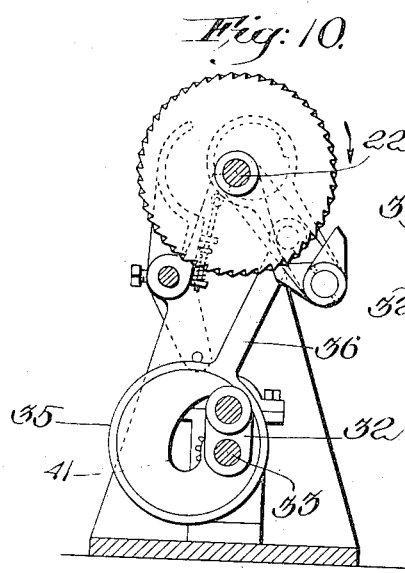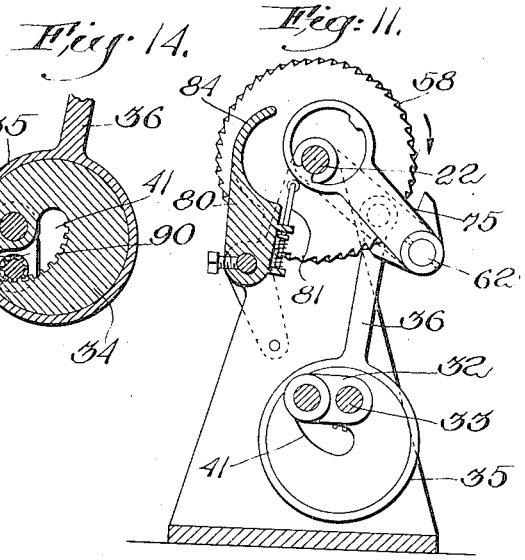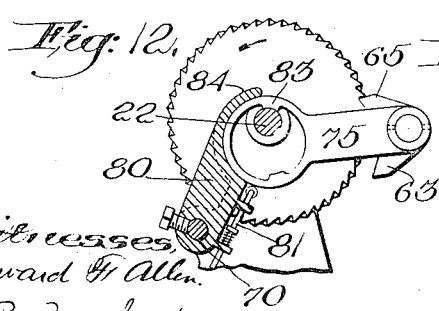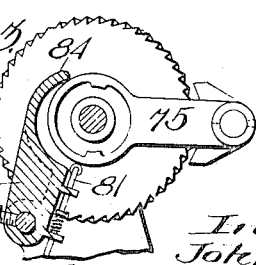

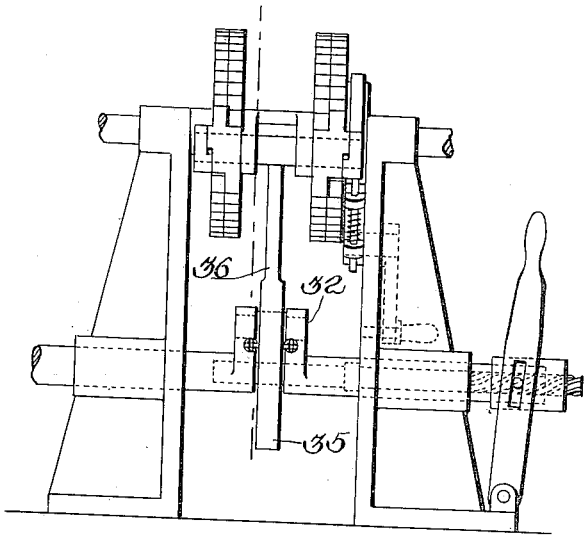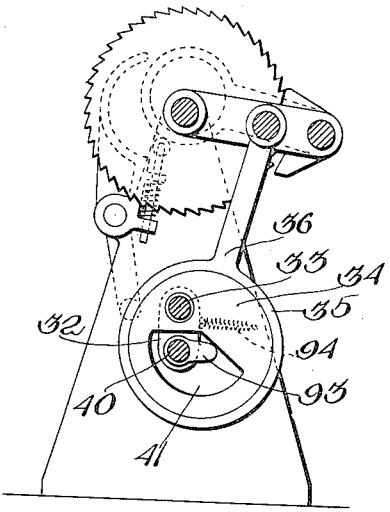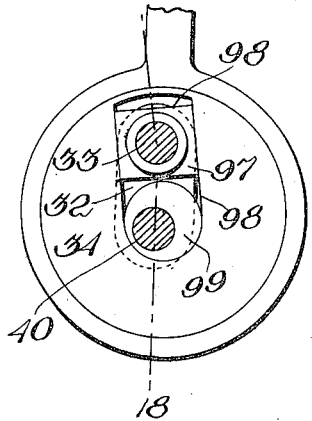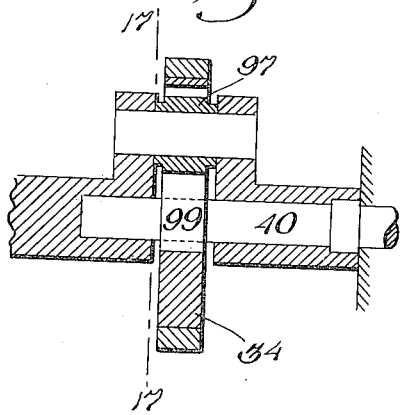

JOHN REECE, OF MANCHESTER, MASSACHUSETTS.

VARIABLE-SPEED TRANSMISSION.

1,181,168.  Specification of Letters Patent.  Patented May 2, 1916.

Application filed January 20, 1914. Serial No. 813,178.

*To all whom it may concern:*

Be it known that I, JOHN REECE, a citizen of the United States, residing at Manchester, in the county of Essex and State of Massachusetts, have invented certain new and useful Improvements in Variable-Speed Transmission, of which the following is a specification, reference being had therein to the accompanying drawing.

This invention relates to variable speed transmission and more particularly to mechanism for transmitting rotary motion from a driving shaft to a driven shaft with variable speed ratio. The two shafts may, for example, be respectively connected to the engine and to the wheels of a motor vehicle, the mechanism hereof permitting the speed of the vehicle to be controlled.

Generally the object hereof is to afford an improved and simplified variable speed transmission mechanism possessing good efficiency of transmission, easily adjustable for varying speed ratio, capable of giving any desired speed ratio between the higher and lower limits and free from the objections of heretofore known mechanisms.

To the attainment of these and other objects, the present improvement consists in the novel combinations, mechanisms, devices, arrangements and details hereinafter referred to and illustrated in the accompanying drawings.

First will be described one or more forms in which the present improvement may be embodied, and thereafter the novel features will be set forth in the claim.

In the accompanying drawings forming a part hereof, Figure 1 is a general view, which may be considered a front view of a variable speed transmission mechanism embodying the present improvements. Fig. 2 is a top or plan view of the mechanism shown in Fig. 1. Fig. 3 is a right-hand elevation of the same. Figs. 4 and 5 are details showing the construction of the double pawls or grippers, Fig. 5 being a section on the plane 5—5 of Fig. 4. Figs. 6 and 7 are detail cross-sections taken respectively on the planes 6—6 and 7—7 of Fig. 1. Figs. 8, 9, 10 and 11 are cross-sections taken on the planes 8—8, 9—9, 10—10 and 11—11 of Fig. 1. Figs. 12 and 13 show some of the parts as in Figs. 9 and 11, but in a different state of adjustment; thus, considering the adjustment of Figs. 9 and 11 as suitable for forward driving, Fig. 12 shows the adjustment for reverse and Fig. 13 the neutral position. Another form or embodiment of the invention is indicated in Fig. 14. A third form or embodiment is indicated in Figs. 15 and 16, which respectively are front and right elevations. A fourth form or embodiment of the invention is indicated in Figs. 17 and 18, showing respectively cross-sections taken on the planes 18—18 and 17—17 of each other.

The same reference numerals designate corresponding parts in the several figures of the drawings.

The combination illustrated in the drawings includes besides the continuously rotatable driving and driven shafts, a circularly moving device or rotary crank actuated by, or carried on the driving shaft, a rotary member or drum on the driven shaft, and connections from such device to such member whereby one shaft rotates the other, together with means for varying the action so as to alter the speed ratio of the shafts. The rotary member on the driven shaft is in the nature of a drum with which coöperates an intermittently acting or reciprocating gripper, the gripper being operated from the driving shaft for causing the drum and driven shaft to rotate. The device or crank which is actuated or carried by the driving shaft and has connections for reciprocating the gripper, is shown constructed to be radially enlargeable and diminishable by adjustment for varying its circumferential motion or speed, so that by controlling the effective length of radius of said device, the speed ratio of the two shafts is governed. The rotary drum by being fixed with the driven shaft, constitutes in effect a portion of the shaft. The gripper constitutes a movable part which positively engages and disengages the rotary drum. The gripper does not travel around and around with the driven shaft, but reciprocates at one side of the shaft, preferably in a concentric arc. Its intermittent engagement with the drum or other portion of the driven shaft is of a positive character, that is positive in action as a pawl engaging a ratchet in contradistinction to a mere frictional engagement. When the gripper is driving, the drum, the gripper and the gripper carrying arm are all substantially locked together. Actually pawls and teeth are shown, for convenience of illustration.

Referring specifically to the drawings, it is seen that the driving shaft 21 and the driven shaft 22 are for convenience mounted in the same frame 23, which possesses bearings 24, 24, 24, 24, for the ends of the two shafts, and bearings 25, 25, at intermediate points of the driving shaft.

It being desired to employ a plurality of (four) drums and grippers which may act successively, it is convenient to have a plurality of (four) cranks on the driving shaft, thus dividing the shaft into end sections 27, 27, and intermediate sections 28, 28.

One form of radially enlargeable and diminishable rotary device is a crank with adjustable throw, and such a crank is generally indicated at 29, the driving shaft being provided with four of them between which are the intermediate shaft sections 28, 28. Each crank is intended to be adjustable for varying its throw while the shaft is in rotation. This result may be effected by the following construction: The driving shaft 21 with all its cranks may consist of substantially a single integral rigid piece and the adjustment of crank throw secured by the adjustment of eccentrics surrounding each crank pin, each eccentric connected by a rod with grippers or pawls at the driven shaft. Taking, for example, the left hand of the cranks 29 (Fig. 1), it is shown as comprising the usual side arms 32, 32, and the crank pin or wrist 33. Surrounding the pin 33 is the eccentric 34, surrounded by eccentric strap 35 and rod 36 extending to the grippers as hereinafter to be described. The several cranks may be relatively angularly spaced, for example, 90 degrees apart as shown, so that there will be substantially continuous driving force applied to the driven parts. Each eccentric 34 is shown of considerable diameter for a purpose that will appear. The eccentricity of each eccentric is shown substantially equal to the effective length or radius of the crank arms 32, although this is not in all cases essential. Manifestly, if the eccentric be so fixed upon the crank pin that its center coincides with the axis of the driving shaft, there will be no motion to the eccentric strap and rod and no drive; and that, if the eccentric be swung from such position, the actual throw of each crank will increase. The throw, in fact, will equal the linear distance between the axes of the driving shaft and eccentric. To enable the eccentric to be adjusted relatively to the crank pin and arms and to be held rigid in each adjustment for the purpose of varying the actual throw of each crank, the following mechanism may be employed: The driving shaft is shown as axially bored from end to end for the reception of an adjusting bar 40, which extends continuously through all four of the cranks and beyond the last crank at the right end (Fig. 1), where it is provided with means for shifting it relatively to the driving shaft for the purposes of adjustment. Each of the eccentrics 34 is recessed at 41 for the reception of the interior adjusting bar 40, and the recesses 41 may be conveniently formed as concentric arcs, so as to allow for relative circular eccentric adjustment. The adjusting bar 40 herein is supposed to normally rotate with the driving shaft and its relative adjustment consists of a rotation relative to the driving shaft. This relative adjustment of the bar 40 is communicated to the eccentric through a series of teeth or pinion 42 on the rod 40 engaging a series of teeth or gear 43 formed at one side of the eccentric. By holding the rod 40 in any relative adjustment the eccentric 34 has a fixed adjustment and the crank 29 has a given throw. Relatively rotating the rod 40 effects a relative shifting of the eccentric, thereby changing the effective throw of the crank 29. A convenient means for relatively adjusting the interior rod 40 comprises a threaded extension 45 thereof, the threads having a high pitch. A sleeve or block 46 is interiorly correspondingly threaded, as seen in Fig. 7, so as to engage the threads 45, while the left end of the block 46 is provided with a spline or projection 47 engaging opposite longitudinal grooves formed at 48 in the driving shaft, as seen in Fig. 6. With this arrangement the block or sleeve 46 continuously rotates with the driving shaft, yet is capable of longitudinal movement relative thereto, and such longitudinal movement, acting upon the threaded portion 45 of the interior adjusting rod, causes the latter to rotatingly advance or recede with relation to the driving shaft, thereby adjusting the crank eccentrics, as already explained. For longitudinally adjusting the block 46 to secure this result, any suitable means such as a hand lever 51 may be employed, this being shown pivoted at 52 and yoked to surround the block 46, the yoked portion of the lever slotted for engagement with pins or studs 53 carried on collar 54 engaged in an annular groove in the block 46, as seen in Figs. 1 and 6. Thus have been described the parts for effecting enlargement or reduction of crank throw for varying circumferential speed and thereby altering the speed ratio of the driving and driven shafts. The connections for actuating the driven shaft therefrom may be as follows: Each crank 29 through its eccentric 34 and rod 36 may effect the oscillation of grippers or pawls for intermittently acting upon drums or ratchets for continuously driving the driven shaft 22. For each crank there may be a pair of drums and grippers to secure symmetrical action. Referring to the left hand portion of Fig. 1, a pair of drums or ratchet wheels 57, 58, is shown, engaged by pivoted grippers or pawls 59, 60. To insure concentric movement of the pawls they are, for convenience, carried at the extremity of a pair of radial arms, 61, 61, having hub loosely mounted on the driven shaft 22 and, as shown in Fig. 8, the eccentric rod 36 is jointed to the arms 61 for effecting their oscillation. The pivoted pawls 59, 60, may be secured together to operate in unison, and for this purpose a pawl-shaft 62 fits loosely through the extremities of the arms 61 and carries the pawls at each extremity. It should be stated that each pivoted pawl 59 or 60 has a forward driving part 63 adapted to engage teeth 64 on the drums 57 and 58, and reverse driving part 65 adapted to engage teeth 66 on each drum. In one adjustment of the pawls and their carrying shaft the driven parts will be advanced by the reciprocation of the pawls, and in the opposite adjustment they will be driven reversely, while an intermediate adjustment removes all of the pawls from the ratchet teeth, thus interrupting the drive. For controlling the adjustment, and thereby the operation, of the pawls the following mechanism may be employed: Between the first pair of drums 57, 58, and the second pair of drums are shown duplicate pawl adjusting devices, and all these devices are operated and controlled by a control shaft 70 extending the whole length of the machine and having at its right extremity, as seen in Fig. 3 and in dotted lines in Fig. 1, an adjusting crank arm 71 having a handle 72 controlling a pin, which may set into any one of three apertures or recesses, according to whether the drive is to be forward or reverse or interrupted. The adjusting devices for the left pair of pawls 59, 60, are best seen in Figs. 1, 9 and 11 with details in Figs. 4 and 5. The pawl adjustment is effected through the pawl-shaft 62, which extends beyond the drum 58 and is there provided with a swinging arm 75. The arm 75 is intended to be adjusted between three positions from the shaft 70. Figs. 9 and 11 show it in forward driving position, the pawl portions 63 engaging the drums. It will be understood that the pawls are not in rigid relation with the pawl-shaft adjusting arm 75, and a slight play is allowed for the necessary action of the pawl in running over the teeth. The hub of the arm 75 forms a right hand collar for the end of shaft 62 and a corresponding left hand collar 76 is shown. As seen in Fig. 1 and more clearly in Fig. 4, a slight gap is allowed for the play of the pawl. The cross-section (Fig. 5) shows that the hubs are keyed to the shaft 62, while the pawl with its forward and reverse portions 63 and 65 respectively is capable of the slight play referred to. Referring now to Figs. 8, 9, 10 and 11, the driving shaft's rotation oscillates the pawl carrying arms 61 which in rising effect no drive, but on the return or downward movement cause the pawl portions 63 to engage the teeth 64 of each drum, so as to rotate the drums and the driven shaft with a right hand or forward rotation. The control of the position and operation of these parts is effected from the control shaft 70 by means of a control device 80. When in forward driving adjustment the arm 75 is held in its upward position, as in Figs. 8 to 11, by a yielding or spring actuated pin 81 carried by the device 80. It should be explained that, for convenience, the extremity of the arm 75 is formed as a yoke or ring surrounding the driven shaft 22 and having a stop 82 contacting the shaft when in forward driving adjustment and a stop 83 contacting the shaft when in reverse driving adjustment; and when the arm is intermediate these two adjustments both pawl portions are disengaged and the drive is interrupted. Thus, in Fig. 12, a reverse driving adjustment has been effected by swinging the control shaft 70 and the control device 80, so that the curved portion or horn 84 thereof has engaged and forced downwardly the arm 75 against the resistance of spring pin 81 and until stop 83 contacts shaft 22. As shown, this adjustment throws out of action the pawl portions 63 and throws into action the pawl portions 65. To adjust the parts for interrupting the drive, the control shaft 70 will be set to an intermediate position and this in turn, as shown in Fig. 13, adjusts the other parts to intermediate position. In this adjustment the extremity of arm 75 is held concentric with the driven shaft 22 by the spring pin 81 pressing the arm against the horn 84 of the control device 80.

There has thus far been described a complete variable speed transmission including driving shaft with cranks, means for at will adjusting the throw of the cranks to vary the speed ratio, connections whereby the crank movements are translated into oscillation of grippers or pawls which, operating relatively in succession, serve to apply power for forwardly or reversely actuating the drums which are carried on the driven shaft, manual control being provided for adjustment between forward and reverse drive or interruption of drive.

In the modification shown in Fig. 14 the eccentric 34 and toothed member 43 of the previous figures have been combined by means of forming teeth 90 directly on the eccentric, namely, upon the outer margin of the circular recess 41. When the interior adjusting bar 40 is relatively rotated, it coöperates with the teeth or rack 90 to relatively adjust the eccentric 34 as before.

In the modification shown in Figs. 15 and 16, the use of teeth is dispensed with and within the recess 41 and the eccentric 34 the driving shaft, which always revolves in one direction, carries the eccentric around with it by means of a lug or cam 93 which pushes against the eccentric in the recessed portion of the latter. This lug or cam 93 is not mounted directly on the driving shaft, but upon the interior adjusting bar 40. Thereby the adjustment of the bar 40 changes the position of the lug 93, so as to change the relative position of the eccentric 34, thereby changing the throw of the crank. In order to better maintain the lug 93 and eccentric 34 in contact, as shown, a spring 94 may be stretched between the crank arm 32 and the eccentric.

In the modification shown in Figs. 17 and 18, the eccentric 34, instead of adjusting by swinging about the crank pin 33, is adapted to radially slide relatively to the crank pin under control of the interior bar 40. A square block 97 surrounds the crank pin 33 and engages in a radial recess formed at 98 in the eccentric 34. For relatively adjusting the eccentric 34 a similar eccentric 99 is fixed upon the rod 40 and engages in the inner end of groove 98. By this arrangement relative rotation of the rod 40 shifts the eccentric 99 and thereby adjusts the position of eccentric 34 to increase or decrease the effective throw of the crank.

If desired, some yielding element may be introduced between the driving crank 29 and the driven shaft 22 or the drums carried by the latter, so as to permit equalization between uniform rotation of the driven shaft and non-uniform driving motion. The illustrated crank shaft with adjustable throw might in some cases be employed otherwise than as illustrated for the communication of power, and likewise the connections therefrom to the driven shaft might be employed in combination with other and different means of reciprocation.

It will thus be seen that there has been described a variable speed transmission accomplishing the recited objects and advantages and other advantages will be apparent to those acquainted with the art. Since many matters of design, arrangement, detail, and other features may be indefinitely varied without departing from the invention herein involved, no limitation to such features is intended excepting as specified in the appended claim.

What is claimed is:

A variable speed transmitting apparatus including in combination, a driving shaft, a driven shaft, said driving shaft formed with a plurality of cranks, an eccentric mounted on each crank and having connections for rotating the driven shaft, said driving shaft formed with a longitudinal opening axially arranged, an adjusting rod located within the axial recess in said driving shaft adapted to rotate with the driving shaft, but capable of slight adjustment with respect thereto, means adjacent to the end of said driving shaft for effecting a shifting of the rod relatively to the shaft, and connections between said rod and all of said eccentrics, whereby the rod adjustment alters the effective throw of the eccentrics.

In testimony whereof I affix my signature in presence of two witnesses.

JOHN REECE.

Witnesses:
E. P. BERNHARDT,
WM. J. DOLAN.